United States Patent [19]

Chapman

[11] 3,846,710

[45] Nov. 5, 1974

[54] DC RESTORATION AMPLIFIER WITH AUTOMATIC ZERO OFFSET ADJUSTMENT

[75] Inventor: Ronald H. Chapman, Wheaton, Ill.

[73] Assignee: Motorola, Inc., Franklin Park, Ill.

[22] Filed: Feb. 2, 1973

[21] Appl. No.: 329,266

[52] U.S. Cl. ............... 330/11, 330/30 R, 330/30 D, 330/126

[51] Int. Cl. ............................................ H03f 21/00

[58] Field of Search .......... 330/11, 30 D, 126, 30 R, 330/149, 69; 178/DIG. 26, 7.3 DC, 7.5 DC; 328/151

[56] References Cited

UNITED STATES PATENTS

| | | | |
|---|---|---|---|
| 2,697,758 | 12/1954 | Little | 330/126 |
| 3,727,147 | 4/1973 | Dewitt | 330/126 X |

*Primary Examiner*—Herman Karl Saalbach
*Assistant Examiner*—James B. Mullins
*Attorney, Agent, or Firm*—Eugene A. Parsons; Vincent J. Rauner

[57] ABSTRACT

A DC restoration amplifier for signals having a first frequency range and DC offset signals having a second frequency range lower than the first frequency range includes a first filter having a filter response characteristic for coupling therethrough at least the range of frequences of the first signals and the offset signals; and a second filter for coupling therethrough the range of frequencies of the DC offset signals. A summing circuit coupled to the first filter and second filter subtracts the DC offset signals developing a resultant signal proportional to the first signals. A DC restoration circuit coupled to the summing circuit receives the resultant signals and develops second signals corresponding to the first signals and having a DC reference bias of one-half the peak-to-peak amplitude of the second signals.

14 Claims, 2 Drawing Figures

DC RESTORATION AMPLIFIER WITH AUTOMATIC ZERO OFFSET ADJUSTMENT

BACKGROUND

In radio communication systems, misalignment, environmental changes and/or aging can cause a slight difference in frequency between a transmitter and the particular receiver with which it communicates. In FM systems, this frequency offset will cause the receiver discriminator to develop a slight DC offset voltage. This DC offset voltage, if it is not excessive, will not adversely affect audio messages. If digital information is being transmitted, however, the DC offset voltage must be eliminated in order to make effective use of the digital information.

Where it is necessary for a phase modulator to provide a constant deviation, it may not be possible to obtain the necessary deviation at low frequencies. This is because the number of radians of phase shift required to maintain a given deviation is inversely proportional to modulation frequency. Hence, at low frequencies, a greater number of radians are required than can be achieved by the modulator. As a result, the modulator is not capable of transmitting very low frequency signals. At the receiver, this results in the received signals being amplitude modulated by very low frequency signals. The very low frequency amplitude modulation can inhibit proper recognition of the digital information at the receiver, particularly baseband or low frequency digital information.

A DC blocking capacitor can be employed in the signal path in order to eliminate the above noted DC offset voltage. However, the capacitor will cause a rolloff of low frequencies which, in turn, causes an amplitude modulation such as noted above in the comments regarding phase modulators.

The digital information, when transmitted, will loose its exact square wave characteristics and any DC bias level superimposed on the signals to allow manipulation thereof and differential between the various digits. At the receiver it is necessary to recreate the exact square wave characteristics and any DC bias level to again allow manipulation of the digital signals and differentiation between the various digits. Prior art DC restoration circuits although they restore a DC bias, tend to destroy or distort low frequency or baseband digital information.

If digital information is transmitted to a particular receiver from a number of transmitters, each transmitted message can have a different deviation. The received signals will then have different amplitudes. A fixed DC reference cannot be used to superimpose a DC bias level becasue of the variations in amplitude of received signals. A system must be implemented which restores the correct DC reference without it being affected by variations in received signal amplitude.

SUMMARY

It is an object of this invention to provide an improved DC restoration amplifier with automatic offset adjustment for both DC and very low frequency AC offset signals.

Another object of this invention is to provide an DC restoraion amplifier which can recreate the originally transmitted square wave characteristics and any DC bias level necessary for manipulation and recognition of the signals.

Yet another object of this invention is to provide a DC restoration amplifier which is independent of input signal amplitude.

Still another object of this invention is to provide a DC restoration amplifier which will not destroy or distort low frequency or baseband digital information.

In practicing this invention there is provided a DC restoration amplifier for signals having a first frequency range and DC offset signals having a second frequency range lower than the first frequency range. The DC offset signals include DC signals and very low frequency AC signals. The amplifier includes a first filter which has a low pass filter response characteristic of at least the range of frequencies of the first signals and DC offset signals. A second filter has a low pass filter response characteristic of the range of frequencies of the DC offset signals. A summing circuit is coupled to the first and second filters for subtracting the DC offset signals coupled from the second filter from the first signals and DC offset signals coupled from the first filter. The summing circuit develops resultant signals which are proportional only to the first frequency range signals. A DC restoration circuit, including a differential amplifier and peak-to-peak rectifier is coupled to the summing circuit. The DC restoration circuit receives the resultant signals and develops second signals corresponding to the first signals and having a DC reference bias of one-half the peak-to-peak amplitude of the second signals.

THE DRAWINGS

DETAILED DESCRIPTION

Figure 1:
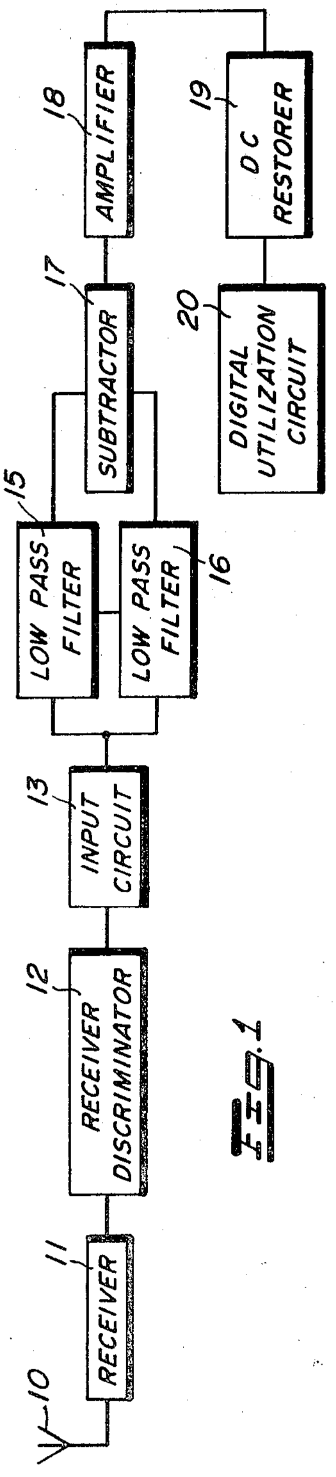
FIG. 1 is a block diagram representation of the DC restoration amplifier of this invention.

Referring to FIG. 1, radio frequency (RF) signals modulated by digital baseband, or low frequency, information are received by antenna 10 and coupled to receiver 11. The RF signals are amplified and hetrodyned in receiver 11 and coupled to discriminator 12. Discriminator 12 extracts the digital baseband signals as modified by the transmission medium. In addition to extracting the digital baseband signals, discriminator 12 can develop a DC offset voltage. The DC offset voltage may be a DC voltage developed at the discriminator in response to a slight difference in frequency between the transmitter and receiver. It may also be a very low frequency AC signal which is developed in the system as a result of the transmitter's inability to transmit very low frequencies, or as a result of coupling capacitors in the digital signal path. In the preferred embodiment, the digital signals have a frequency range of 6 to 75 cycles. The very low frequency AC signals which are of particular interest have a frequency range of DC to 3 Hz. As noted above, the DC offset signals will cause an amplitude modulation of the digital signals and create a DC offset for the digital signals which must be eliminated in order to make effective use of the digital baseband information.

The combined DC offset signals and digital baseband signals are coupled from receiver discriminator 11 to input circuit 13. Input circuit 13 is the first stage of the DC restoration amplifier of this invention. A high input impedance and low output impedance are provided by input circuit 13 in order to isolate receiver discriminator 12 from the following circuitry in the DC restoration amplifier and prevent loading of discriminator 12 which can adversely affect its operation. In addition, input circuit 13 is used to provide an offset voltage which allows the following circuitry in the restoration amplifier to operate off of a single, ground referenced power supply, while allowing discriminator 12 to have voltage offsets which are both negative and positive with respect to ground.

The digital baseband signals and DC offset signals, with the offset voltage added, are coupled from input circuit 13 to low pass filters 15 and 16, which are connected in parallel. Low pass filter 15 is an active low pass filter which has a filter response characteristic for passing the range of frequencies of the DC offset signals. In the preferred embodiment, low pass filter 15 has a corner frequency of 3 Hz. At 3 Hz, this filter begins to attenuate frequencies at a rate of 6 DB per octave. Low pass filter 16 is also an active low pass filter, and has a filter response characteristic for passing at least twice the highest frequency in the digital baseband signals. In the preferred embodiment, low pass filter 16 has a corner frequency at 180 Hz. That is, signals above 180 Hz in frequency will be attenuated at the rate of 18 DB per octave. Low pass filter 16 will, therefore, pass the digital baseband signals and DC offset signals. Filters 15 and 16 are also connected together in order to provide approximately equal response times from both filters in response to large amplitude DC offset signals. This interaction will be more fully described in a subsequent portion of this application.

The DC offset signals coupled through low pass filter 15 are coupled to one input of subtractor circuit 17; and the DC offset signals and digital baseband signals coupled through low pass filter 16 are coupled to a second input of subtractor circuit 17. Subtractor circuit 17 subtracts the signals coupled from low pass filter 15 from the signals coupled from low pass filter 16 and develops resultant signals which are proportional only to the digital baseband signals. These resultant signals are coupled from subtractor 17 to amplifier 18. Amplifier 18 amplifies the resultant signals and adds a DC bias voltage to these amplified resultant signals which is approximately equal to one-half the amplifier supply voltage. The amplified resultant signals with the added DC bias voltage are then coupled from amplifier 18 to DC restorer 19. DC restorer 19 includes a peak-to-peak detector or rectifier. The peak-to-peak detector receives the signals coupled from amplifier 18 and develops a voltage which is equal to one-half the peak-to-peak voltage of the resultant amplified signals coupled to DC restorer 19. This bias voltage is coupled to one input of a differential amplifier in DC restorer 19. The other input to the differential amplifier is the amplified resultant signals capacitively coupled from amplifier 18. The differential amplifier in DC restorer 19 operates as a slicer with a reference point of one-half the peak-to-peak voltage of the resultant signals. The differential amplifier differentially compares the two signals. If the amplified resultant signals are greater than the bias voltage, the differential amplifier output will be high; if the amplified resultant signals are less than the bias voltage, the differential amplifier output will be low. The amplifier output signals are identical to the originally transmitted digital signals and have a DC bias voltage of one-half the peak-to-peak amplitude of the developed digital signals. The digital signals developed by DC restorer 19 are then coupled to digital utilization circuit 20 where they are operated upon to perform various functions. It is to be understood, however, that the digital utilization circuit is not a part of this invention.

Figure 2:
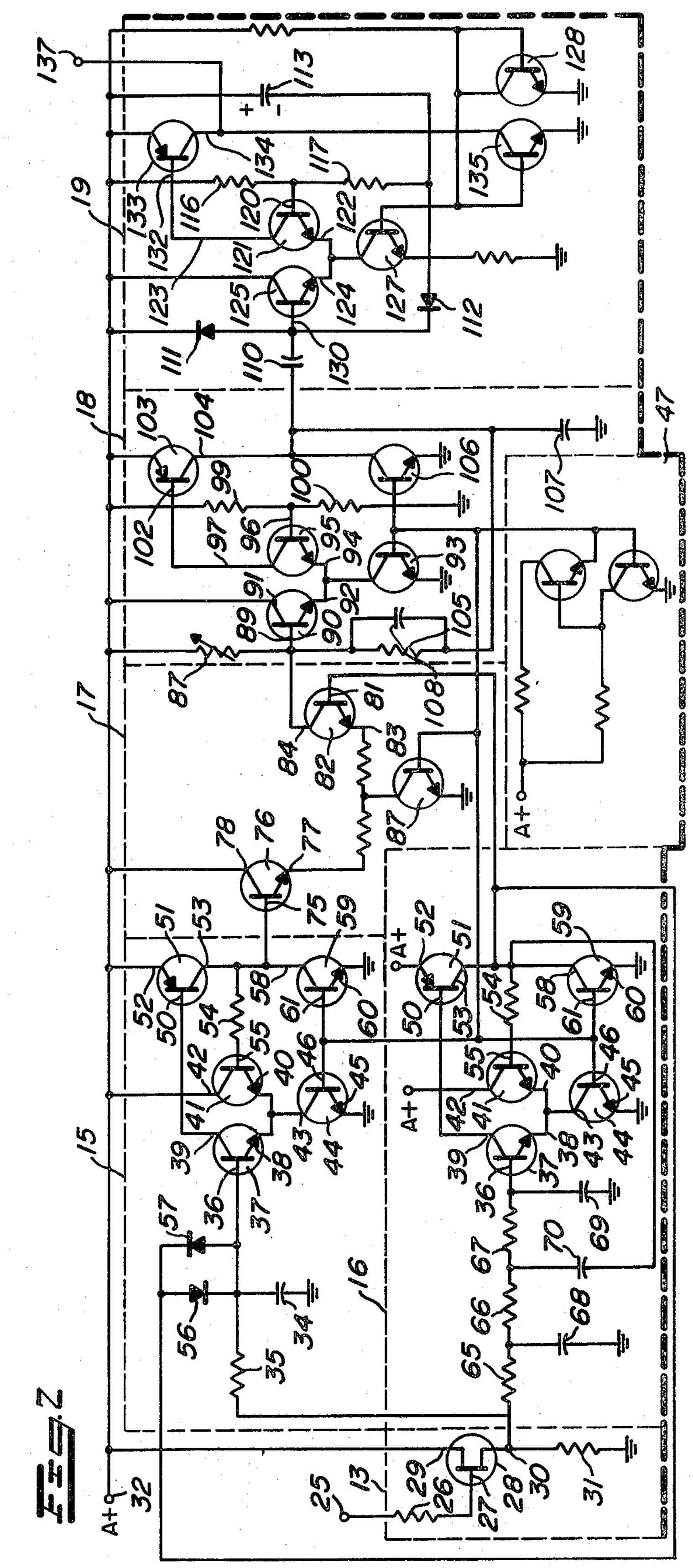
FIG. 2 is a schematic diagram of the DC restoration amplifier shown in FIG. 1.

Referring to FIG. 2, the digital signals, as modified by the transmission medium, and DC offset signals are coupled from receiver discriminator 12 to input terminal 25 of the DC restoration amplifier. The signals are coupled through resistor 26 to gate electrode 27 of FET 28 in input circuit 13. Drain electrode 29 of FET is coupled to supply potential at terminal 32, and source electrode 30 of FET 28 is coupled through DC offset resistor 31 to ground potential. FET 28 has a high input impedance and a low output impedance for isolating the following circuitry in the DC restoration amplifier from discriminator 12, and for preventing loading of the discriminator. The pinch off voltage of FET 28 is used to develop an offset voltage across resistor 31. This offset voltage is added to the digital signals and DC offset signals, thus allowing the remaining circuitry in the DC restoration amplifier to operate from a single ground referenced power supply indicated at terminal 32, while allowing the discriminator to have voltage offsets or swings which are both positive and negative with respect to ground.

The signals developed at source electrode 30 of FET 28 are coupled to the inputs of low pass active filters 15 and 16. Low pass active filter 15 includes resistor 35 and capacitor 34 having a first terminal coupled to source electrode 30 of FET 28, and a second electrode coupled to base electrode 36 of transistor 37. Emitter electrode 38 of transistor 37 is coupled to emitter electrode 40 of transistor 41. Transistors 37 and 41 form a differential amplifier. Emitter electrodes 38 and 40 of transistors 37 and 41 are coupled to collector electrode 43 of transistor 44. Emitter electrode 45 of transistor 44 is coupled to ground potential. Transistor 44 acts as a current source for the differential amplifier consisting of transistors 37 and 41. Base current for current source transistor 44 is supplied to base electrode 46 by base current current source 47. Base current current source 47 supplies the base current for a number of differential amplifier current sources in the DC restoration amplifier. Collector electrode 42 of transistor 41 is coupled to supply voltage at terminal 32. Collector electrode 39 of transistor 37 is coupled to base electrode 50 of transistor 51. Emitter electrode 52 of transistor 51 is coupled to supply potential at terminal 32, and collector electrode 53 of transistor 51 is coupled to one terminal of resistor 54. The other terminal of resistor 54 is coupled to base electrode 55 of transistor 41. Transistor 51 acts as an inverter in low pass active filter 15. Collector electrode 53 of transistor 51 is also coupled to collector electrode 58 of transistor 59. Emitter electrode 60 of transistor 59 is coupled to ground potential, and base electrode 61 is coupled to base current current source 47. Transistor 59 is a current source and acts as an active load for transistor 51.

The signals are coupled through low pass active filter 15 and coupled through resistor 35 to base electrode 36 of transistor 37. The selected DC offset signals, that is, DC offset signals and very low frequency AC signals, are developed at collector 39 of transistor 37 while higher frequency signals are attenuated as noted above. The signals developed at collector electrode 39 are coupled to base electrode 50 of inverter 51. Inverter 51 develops an inverted DC offset signal at collector electrode 53 which is the output of low pass filter 15. Collector electrode 53 of transistor inverter 51 is coupled back to base electrode 55 of transistor 42 and acts to provide negative feedback for the amplifier, causing the amplifier to maintain a unity or +1 gain amplification characteristic.

Low pass active filter 16 is similar in general configuration to low pass active filter 15. Like components in low pass active filter 16 will therefore be designated with the same numbers as those in low pass active filter 15.

Signals developed at source electrode 30 of FET 28 are coupled through resistors 65, 66 and 67 in low pass active filter 15 to base electrode 36 of transistor 37 of the differential amplifier consisting of transistors 37 and 41. Capacitor 68 coupled form the junctions of resistor 65 and 66 to ground potential, capacitor 69 coupled from the junction of resistor 67 and base electrode 36 of transistor 37 to ground potential, and capacitor 70 coupled from the junction of resistors 66 and 67 to collector electrode 53 of transistor 51 and resistors 65, 66 and 67 constitute the passive components in low pass active filter 16 which are necessary to provide the desired frequency response characteristics.

The selected DC offset signals and digital baseband signals are developed at collector 39 of transistor 37 while higher frequency signals are attenuated as noted above. The signals developed at collector electrode 39 are coupled to base electrode 50 of inverter transistor 51. Inverted signals are developed at collector electrode 53 of transistor inverter 51, which is also the output of low pass active filter 16. Collector electrode 53 of transistor 51 is coupled to base electrode 55 of transistor 41 through resistor 54 in order to provide bias to transistor 41 and also to provide negative feedback for maintaining a unity gain amplification characteristic. Collector electrode 53 is also coupled to one terminal of capacitor 70, as noted above, in order to provide positive feedback for the filter which is necessary to obtain the desired low pass frequency response characteristic.

If a large amplitude DC offset signal occurs, for example, 1.0 volt, the DC offset developed at source electrode 30 of FET 28, is coupled through filter 16 in a shorter period of time than through filter 15. As a result, subtractor 17 can be momentarily cut off or saturated, thus preventing the digital signals from being coupled through subtractor 17. In order to prevent such an occurrence, diodes 56 and 57 are coupled in parallel and arranged to conduct in opposite directions, from collector electrode 53 of transistor 50 in filter 16 to base electrode 36 of transistor 37 in filter 15. Diodes 56 and 57 will conduct if the difference in voltage between collector electrode 53 in filter 16 and base electrode 36 in filter 15 exceeds the diode drop. This will couple the voltage developed at collector electrode 53 in filter 16 to base electrode 36 in filter 15, forcing the DC output voltage of filter 15 to follow the DC offset signals of filter 16 while capacitor 34 in filter 15 charges. With both inputs to subtractor 17 receiving approximately the same DC signals, subtractor 17 will not cut off or saturate.

The inverted DC offset signals are coupled form collector electrode 53 of transistor 51 in low pass active filter 15 to base electrode 75 of transistor 76 in subtractor circuit 17. The DC offset signals and digital baseband signals developed at collector 53 of transistor 51 in low pass active filter 16 are coupled to base electrode 81 of transistor 82 in subtractor circuit 17. Transistors 76 and 82 form a differential amplifier in subtractor circuit 17. Transistor 87, coupled to emitter electrodes 77 and 83 of transistors 76 and 82 act as a current source for the differential amplifier. Base current for current source transistor 87 is obtained from base current current source 47.

The signals coupled to subtractor circuit 17 from low pass active filter 15 and low pass active filter 16 are subtracted from one another in the differential amplifier consisting of transistors 76 and 82, causing a resultant current to be developed at collector electrode 84 of transistor 82. This resultant current is proportional to the difference between the DC offset signal coupled from low pass active filter 15 and the DC offset signals plus digital baseband signals coupled from low pass active filter 16. The resultant signal is therefore, proportional only to the digital baseband signals.

Resistor 87 in amplifier 18 is coupled from a source of supply potential at terminal 32 to collector electrode 84 of transistor 82 in subtractor circuit 17. The current developed at collector electrode 84 of transistor 82 causes a varying voltage to be developed across potentiometer 87 which is proportional only to the digital baseband signals. This voltage is coupled from the junction of resistor 87 and collector electrode 84 to base electrode 89 of transistor 90 in amplifier 18. Collector electrode 91 of transistor 90 is coupled to a source of supply potential at terminal 32, and emitter electrode 92 is coupled to emitter electrode 94 of transistor 95 in amplifier 18. A current source transistor 97 provides the current for operation of the differential amplifier consisting of transistors 90 and 95. Base current for current source transistor 93 is also obtained from base current current source 47. The resistive divider consisting or resistors 99 and 100 couple between a source of supply potential at terminal 32 and ground potential, provides a fixed bias to base electrode 96 of transistor 95 of the differential amplifier. In the preferred embodiment, resistors 99 and 100 are equal so that the bias at base electrode 96 is equal to one-half the supply voltage.

The varying voltage coupled to base electrode 89 of the differential amplifier is compared to the DC bias signals coupled to base electrode 96 of the differential amplifier causing a resultant amplified signal to be developed at collector electrode 97 of transistor 95 in the differential amplifier. This amplified resultant signal has the same characteristics as the resultant signal with a DC reference bias level of one-half the supply voltage. The signal is coupled from collector electrode 97 of transistor 95 to base electrode 102 of transistor inverter 103. An inverted resultant amplified signal is developed at collector electrode 104 of transistor inverter 103, which is also the output of amplifier 18. Collector electrode 104 of transistor inverter 103 is coupled to current source transistor 106 which acts as a current source for transistor 103. Base current for current source transistor 106 is obtained from base current current source 47. Collector electrode 104 of transistor inverter 103 is also coupled through resistor 105 to base electrode 89 of transistor 90 in order to provide negative feedback for maintaining a constant gain in amplifier 18. Capacitor 107 coupled from collector electrode 104 to ground potential, and capacitor 108 coupled across resistor 105 are both high frequency bypass capacitors which act to prevent the occurrence of undesired oscillations in amplifier 18.

The amplified resultant inverted signals are coupled from collector electrode 104 in amplifier 18 to one terminal of capacitor 110 in DC restorer 19. Diode 111 is coupled from the source of supply potential at terminal 32 to the other terminal of capacitor 110. Diode 112 has one terminal coupled to the junction of capacitor 110 and diode 111, and the other terminal coupled to one terminal of capacitor 113. The second terminal of capacitor 113 is also coupled to the source of supply potential at terminal 32. Capacitors 110 and 113, and diodes 111 and 112 form a peak-to-peak detector or rectifier. The peak-to-peak rectifier develops a DC bias voltage at the junction of diode 112 and capacitor 113 which is equal to the peak-to-peak value of the amplified resultant inverted signals coupled to capacitor 110. It is to be understood, however, that this voltage will only be developed if the amplitude of the amplified resultant signal coupled to capacitor 110 is larger than the forward voltage drop of diodes 111 and 112.

Resistors 116 and 117 are serially connected between the source of potential at terminal 32 and the junction of diode 112 and capacitor 113. The total voltage, therefore, across the serial combination of resistors 116 and 117 is equal to the peak-to-peak bias voltage developed at the junction of capacitor 113 and diode 112. In the preferred embodiment, resistors 116 and 117 are equal so that the bias potential developed at the junction of resistors 116 and 117 is equal to one-half the peak-to-peak bias voltage. This bias voltage is coupled from the junction of resistors 116 and 117 to base electrode 120 of transistor 121. Emitter electrode 122 of transistor 121 is coupled to emitter electrode 124 of transistor 125. Transistors 121 and 125 form a differential amplifier in DC restorer circuit 19. Transistor 127, coupled to emitters 122 and 124 of transistors 121 and 125, respectively, acts as a current source for the differential amplifier. Base current for current source 127 is supplied by base current current source 128.

The amplified resultant inverted signals developed by amplifier 18 is coupled from amplifier 18 through capacitor 110 to base electrode 130 of transistor 125 in the differential amplifier. Of course, capacitor 110 acts to block the DC bias level, however, the diode 111 acts to clamp the positive portion of the peak signals coupled through capacitor 110 to supply voltage. The signals coupled to base electrode 130 vary from supply voltage towards ground potential. With base electrode 120 of transistor 121 and the differential amplifier biased at one-half the peak-to-peak voltage of the input signal, the differential amplifier will shift in response to the input signals at base electrode 130 about a DC reference point of one-half the peak-to-peak voltage. The output signal developed at collector 123 of transistor 121 will therefore be a signal corresponding to the signal coupled to base 130 which varies about a DC bias point which is equal to one-half the peak-to-peak signal developed at base electrode 130. This is also equal to one-half the peak-to-peak signal developed at collector electrode 123. In addition to restoring a bias of one-half the peak-to-peak signal, the clamping action provided by a diode 111 and the amplification provided by the differential amplifier consisting of transistors 121 and 125 will tend to restore the square wave characteristics of the digital baseband signal. That is, as the signals are coupled through low pass filters 15 and 16, the corners of the square waves are rounded. The clamping action and amplification provided by diode 111 and the differential amplifier acts to restore the corners of these square wave signals.

The restored digital baseband signals developed at collector electrode 123 of transistor 121 are coupled to base electrode 132 of inverter transistor 133. Inverter transistor 133 develops an inverted restored digital baseband signal having a DC reference bias level of one-half the peak-to-peak voltage of the digital baseband signals, at collector electrode 134. Collector electrode 134 is also coupled to current source transistor 135 which acts as a constant current source for inverter transistor 133. Base current for current source transistor 135 is provided by base current current source 135. The restored digital baseband signals developed at collector electrode 134 of inverter transistor 133 are coupled to output terminal 137 which may be coupled to a digital utilization circuit 20, such as shown in FIG. 1 for use as noted above.

As can be seen, an improved DC restoration amplifier has been provided with automatic offset adjustments for both DC and very low frequency AC offset signals. This restoration amplifier can recreate the originally transmitted square wave characteristics and any DC bias level necessary for manipulation and recognition of the signals. The DC restoration and square wave characteristics restoration can be accomplished independent of input signal amplitude and without destroying or distorting digital baseband information.

I claim:

1. A DC restoration amplifier for first signals having a first frequency range and DC offset signals having a second frequency range lower than said first frequency range including in combination; first filter means having a filter response characteristic for coupling therethrough at least the range of frequencies of the first signals and offset signals coupled thereto, second filter means for coupling therethrough the range of frequencies of the DC offset signals coupled thereto, summing means coupled to said first and second filter means for subtracting said DC offset signals coupled thereto from said second filter means from said first signals and DC offset signals coupled thereto from said first filter means and develop resultant signals proportional to said first frequency range signals, and DC restoration means coupled to said summing means and responsive to said resultant signals to develop second signals corresponding to said first signals and having a DC reference bias of one-half the peak-to-peak amplitude of said second signals.

2. The DC restoration amplifier of claim 1 wherein said DC restoration means includes, circuit means for receiving said resultant signals and developing amplified resultant signals, peak-to-peak amplitude detector means coupled to said circuit means and operative to develop a bias signal equal to one-half the peak-to-peak amplitude of said amplified resultant signals, and DC level shifting means having a first input for receiving said amplified resultant signals and a second input for receiving said bias signal, said DC level shifting means being operative in response to said signals to develop said second signals.

3. The DC restoration amplifier of claim 2 wherein said DC level shifting means includes differential amplifier means having a first input for receiving said amplified resultant signals and a second input for receiving said bias signal.

4. The DC restoration amplifier of claim 3 wherein said summing means includes differential amplifier means having a first input coupled to said first filter means and a second input coupled to said second filter means.

5. The DC restoration amplifier of claim 4 wherein said first and second filter means are active filters having substantially unity gain.

6. The DC restoration amplifier of claim 5 wherein said peak-to-peak amplitude detector means includes first capacitance means having a first terminal for receiving said amplified resultant signals and a second terminal, first diode means having a first terminal coupled to said first capacitance means second terminal and a second terminal coupled to a source of potential, second diode means having a first terminal coupled to said first capacitance means second terminal and a second terminal, and second capacitance means having a first terminal coupled to said second diode means second terminal and a second terminal coupled to said source of potential, said differential amplifier means first input being coupled to said first capacitance means second terminal and said differential amplifier means second input being coupled to said second capacitance means first terminal.

7. The DC restoration amplifier of claim 6 wherein said circuit means includes, differential amplifier means having one input coupled to said summing means for receiving said resultant signals therefrom and a second input, bias means for providing a bias of one-half said source of potential coupled to said second input, said differential amplifier means being operative to develop said amplified resultant signals, said amplified resultant signals having a DC reference bias voltage of one-half said source of potential.

8. A DC restoration amplifier for restoring a DC reference bias to signals coupled thereto and wherein said amplifier operates from a source of potential, said amplifier including in combination, circuit means for receiving said signals and developing amplified signals, peak-to-peak amplitude detector means coupled to said circuit means and operative to develop a DC reference bias signal equal to one-half the peak-to-peak amplitude of said amplified signals, and DC level shifting means having a first input for receiving said amplified signals and a second input for receiving said DC reference bias signals, said DC level shifting means being operative in response thereto to develop a second signal corresponding to said input signals and having a DC reference bias of one-half the peak-to-peak amplitude of said amplified signals.

9. The DC restoration amplifier of claim 8 wherein said DC level shifting means includes differential amplifier means having a first input for receiving said amplified signals and a second input for receiving said bias signal.

10. The DC restoration amplifier of claim 9 wherein said circuit means includes differential amplifier means having one input for receiving said input signals and a second input, bias means for providing a bias of one-half said source of potential coupled to said second input, said differential amplifier means being operative to develop said amplified signals, said amplified signals having the same characteristics as said input signals and a reference bias voltage of one-half said source of potential.

11. The DC restoration amplifier of claim 10 wherein said peak-to-peak amplitude detector means includes first capacitance means having a first terminal for receiving said amplified signals and a second terminal, first diode means having a first terminal coupled to said first capacitance means second terminal and the second terminal coupled to a source of potential, second diode means having a first terminal coupled to said first capacitance means second terminal and a second terminal, and second capacitance means having a first terminal coupled to said second diode means second terminal and a second terminal coupled to said source of potential, said differential amplifier means first input being coupled to said first capacitance means second terminal, and said differential amplifier means second input being coupled to said second capacitance means first terminal.

12. An automatic zero offset adjustment circuit having input signals, including first frequency range signals and DC offset signals, coupled thereto, including in combination; first filter means having the input signals coupled thereto and a filter response characteristic for coupling therethrough at least the range of frequencies of the first frequency signals and DC offset signals, second filter means having the input signals coupled thereto and a frequency response characteristic for coupling therethrough the range of frequencies of the DC offset signals, summing means, including differential amplifier means, coupled to said first ans second filter means for subtracting said DC offset signals coupled thereto from said second filter means from said first frequency signals and DC offset signals coupled thereto from said first filter means to develop resultant signals proportional only to said first frequency signals, and connecting means for coupling between said first and second filter means to provide substantially equal response times of said first and second filter means in response to large amplitude DC offset signals.

13. The circuit of claim 12 wherein said first and second filter means are active filters having substantially unity gain and wherein said connecting means includes a pair of oppositely connected parallel diodes.

14. The circuit of claim 13 wherein said first filter means has a filter response characteristic for passing signals from DC to 180 Hz, and said second filter means has a filter response characteristic for passing signals from DC to 3 Hz.

* * * * *

REEXAMINATION CERTIFICATE (668th)

United States Patent [19]

[11] B1 3,846,710

Chapman

[45] Certificate Issued Apr. 28, 1987

[54] DC RESTORATION AMPLIFIER WITH AUTOMATIC ZERO OFFSET ADJUSTMENT

[75] Inventor: Ronald H. Chapman, Wheaton, Ill.

[73] Assignee: Motorola, Inc., Franklin Park, Ill.

Reexamination Request:
No. 90/001,080, Sep. 8, 1986

Reexamination Certificate for:

| | |
|---|---|
| Patent No.: | **3,846,710** |
| Issued: | **Nov. 5, 1974** |
| Appl. No.: | **329,266** |
| Filed: | **Feb. 2, 1973** |

[51] Int. Cl.[4] ............................................. H03F 21/00

[52] U.S. Cl. ...................................... 330/11; 328/167; 375/76; 375/102; 375/103; 330/69; 330/126; 330/149; 330/252

[58] Field of Search .................. 330/11, 69, 126, 149, 330/252; 328/151, 163, 164, 167; 375/76, 102, 103, 99

[56] References Cited

U.S. PATENT DOCUMENTS

| | | | |
|---|---|---|---|
| 2,783,314 | 2/1957 | Reaves | 179/171 |
| 2,802,939 | 8/1957 | Klehfoth | 250/20 |
| 2,846,523 | 8/1958 | Leavitt et al. | 179/171 |
| 3,076,939 | 2/1963 | Wycoff | 328/137 |
| 3,128,437 | 4/1964 | Loughlin | 329/133 |
| 3,130,371 | 4/1964 | Copeland | 328/54 |
| 3,383,600 | 5/1968 | Calfee | 325/320 |
| 3,413,412 | 11/1968 | Townsend | 178/7.1 |
| 3,439,277 | 4/1969 | Schulein | 325/474 |
| 3,538,253 | 11/1970 | Braun | 179/1 |
| 3,557,305 | 1/1971 | Dann | 178/7.3 |
| 3,579,123 | 5/1971 | Koga | 328/164 |
| 3,588,714 | 6/1971 | McIntosh | 328/164 |
| 3,599,155 | 8/1971 | McDowell | 340/172.5 |
| 3,601,708 | 8/1971 | Stempler | 328/155 |
| 3,614,317 | 10/1971 | Bellowitz | 178/66 |

*Primary Examiner*—James B. Mullins

[57] ABSTRACT

A DC restoration amplifier for signals having a first frequency range and DC offset signals having a second frequency range lower than the first frequency range includes a first filter having a filter response characteristic for coupling therethrough at least the range of frequences of the first signals and the offset signals; and a second filter for coupling therethrough the range of frequencies of the DC offset signals. A summing circuit coupled to the first filter and second filter subtracts the DC offset signals developing a resultant signal proportional to the first signals. A DC restoration circuit coupled to the summing circuit receives the resultant signals and develops second signals corresponding to the first signals and having a DC reference bias of one-half the peak-to-peak amplitude of the second signals.

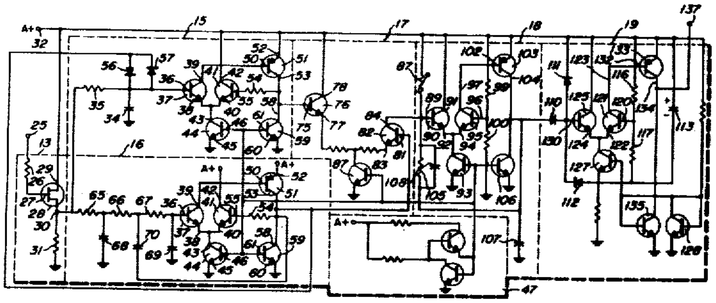

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *